T. W. BACCHUS.
MACHINE FOR PACKING GELATIN DYNAMITE.
APPLICATION FILED OCT. 2, 1906.
929,815.
Patented Aug. 3, 1909.
7 SHEETS—SHEET 3.
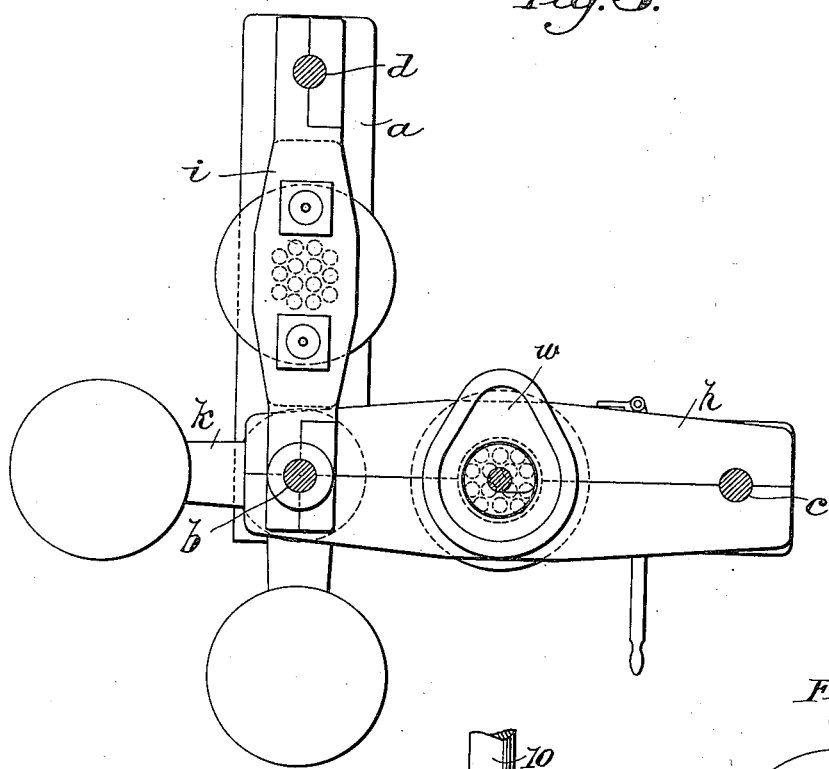
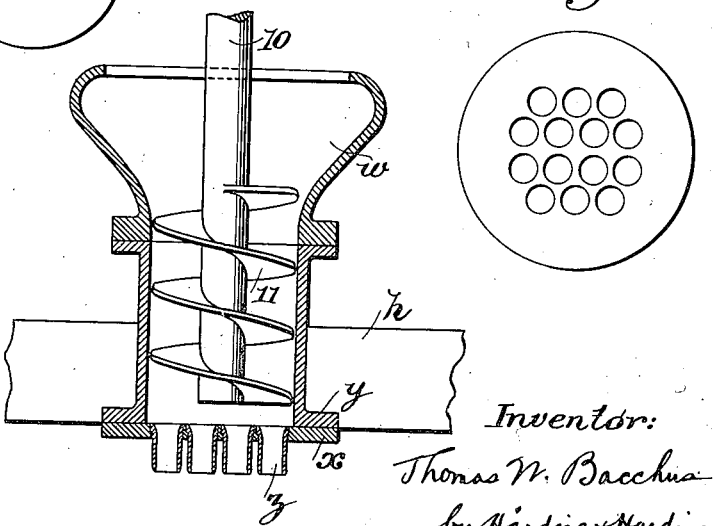
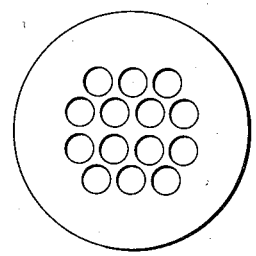
Witnesses:
Inventor:
Thomas W. Bacchus
by Harding & Harding
Attorneys

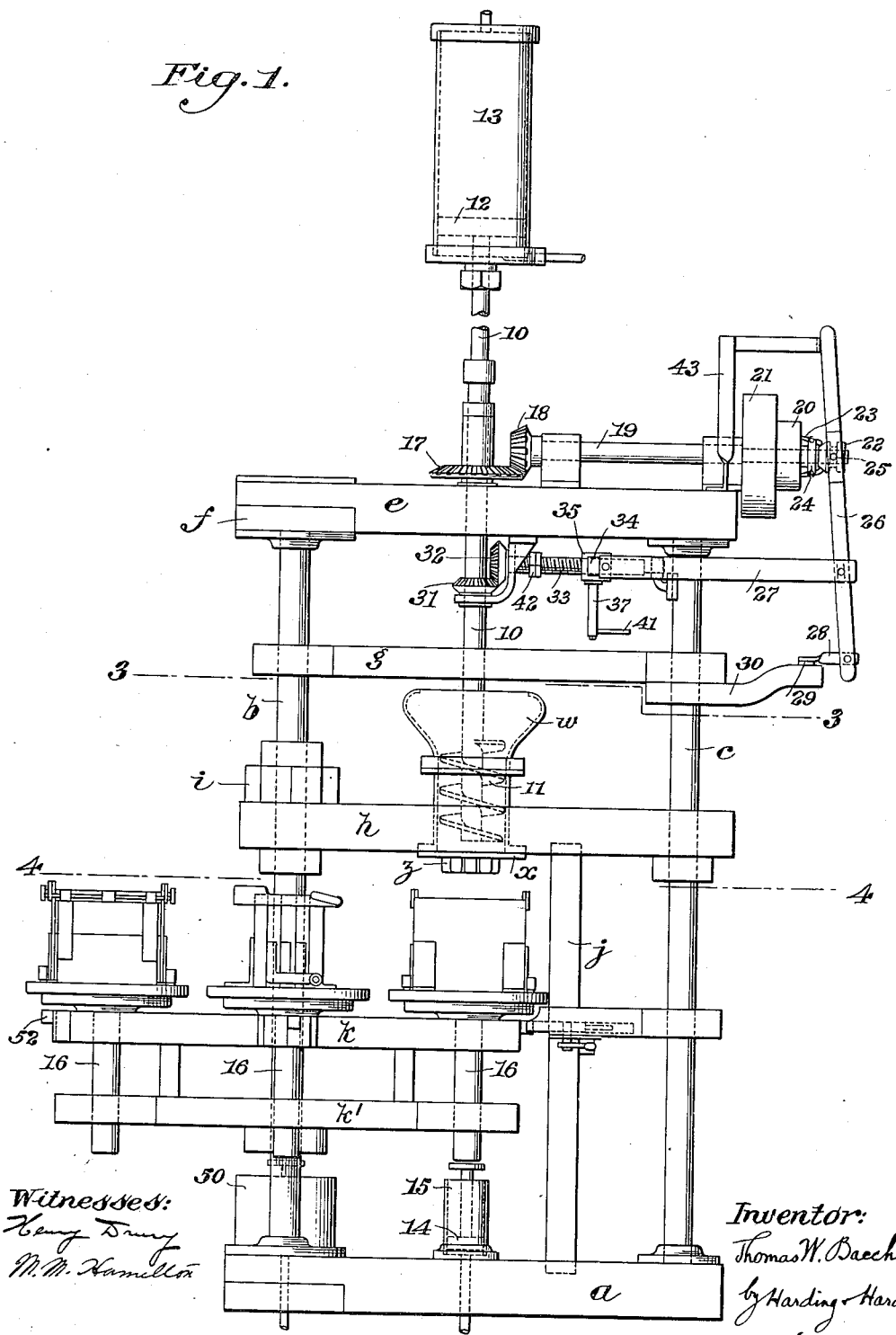

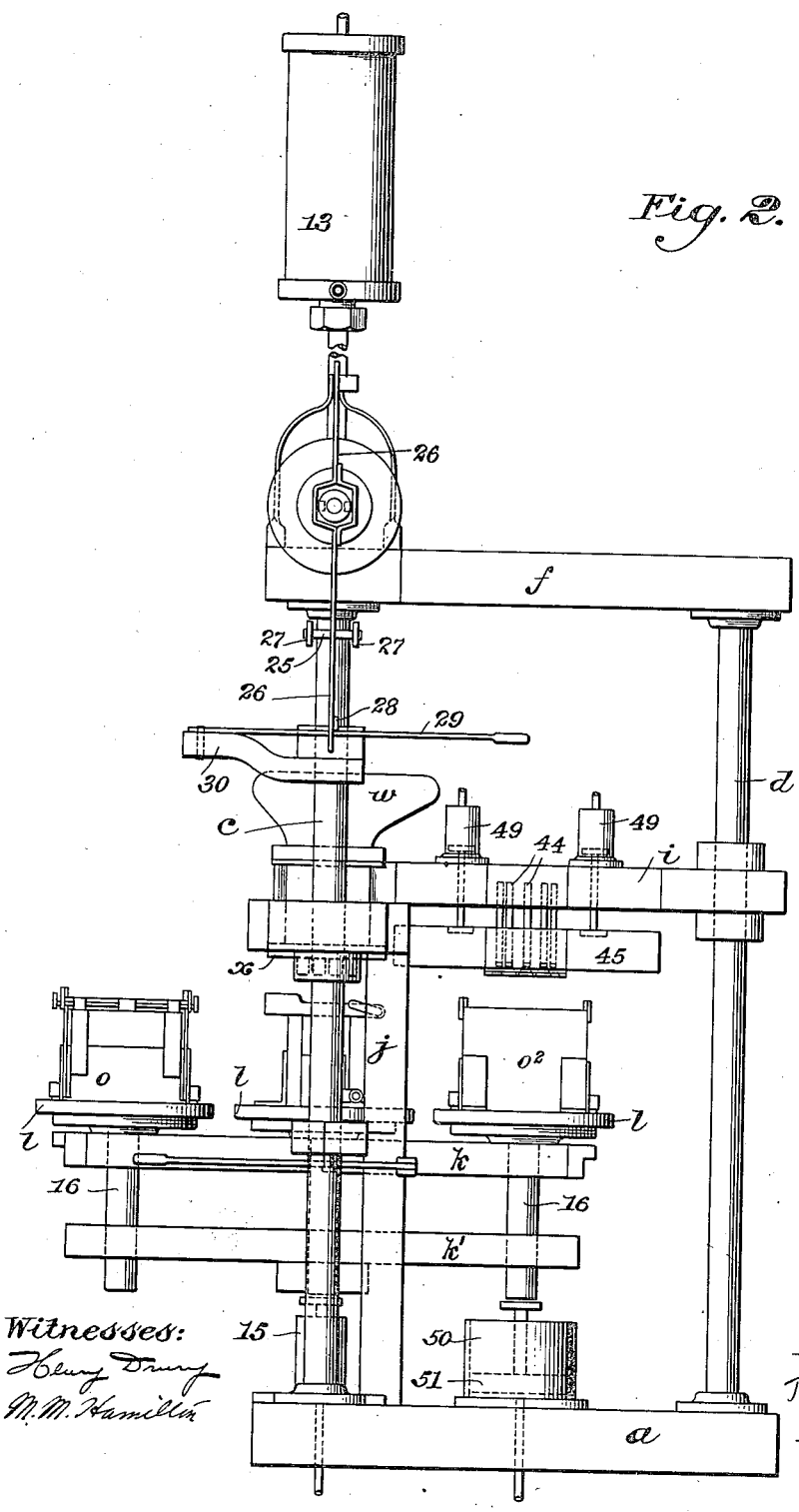

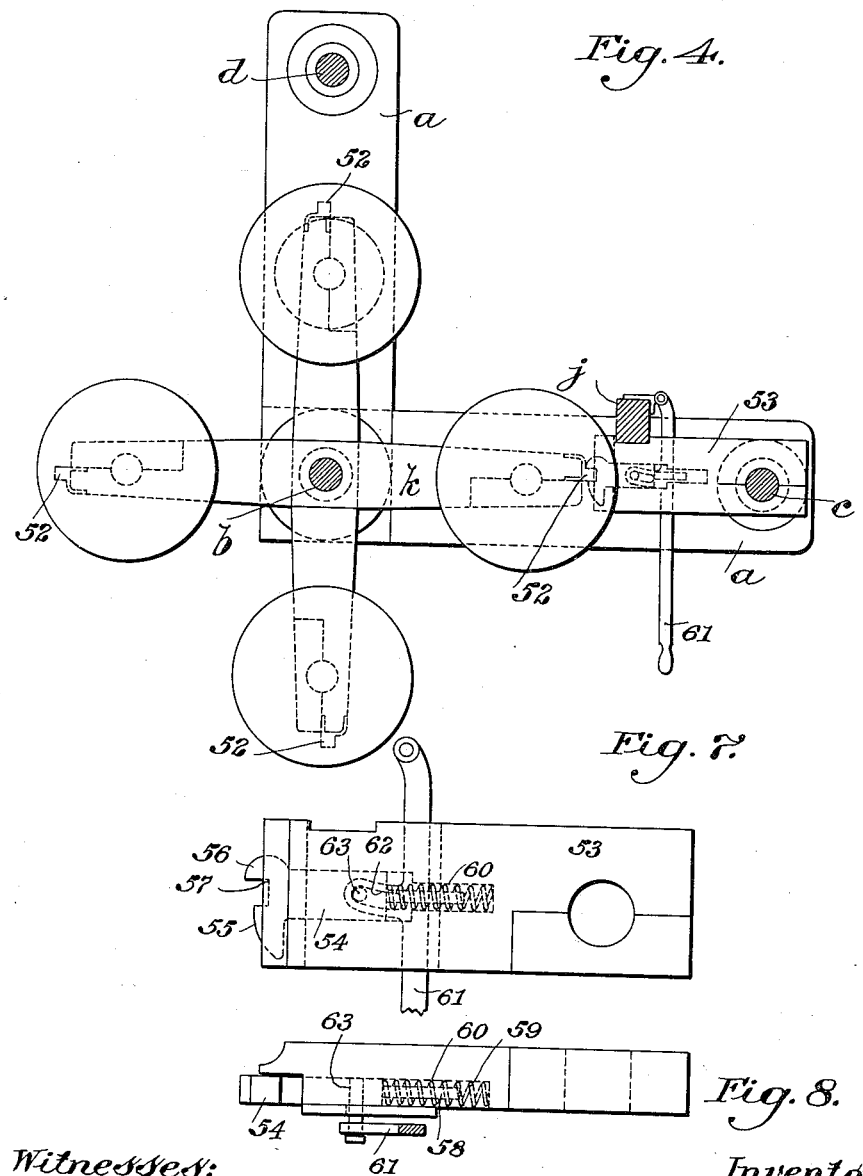

T. W. BACCHUS.
MACHINE FOR PACKING GELATIN DYNAMITE.
APPLICATION FILED OCT. 2, 1906.
929,815.
Patented Aug. 3, 1909.
7 SHEETS—SHEET 5.
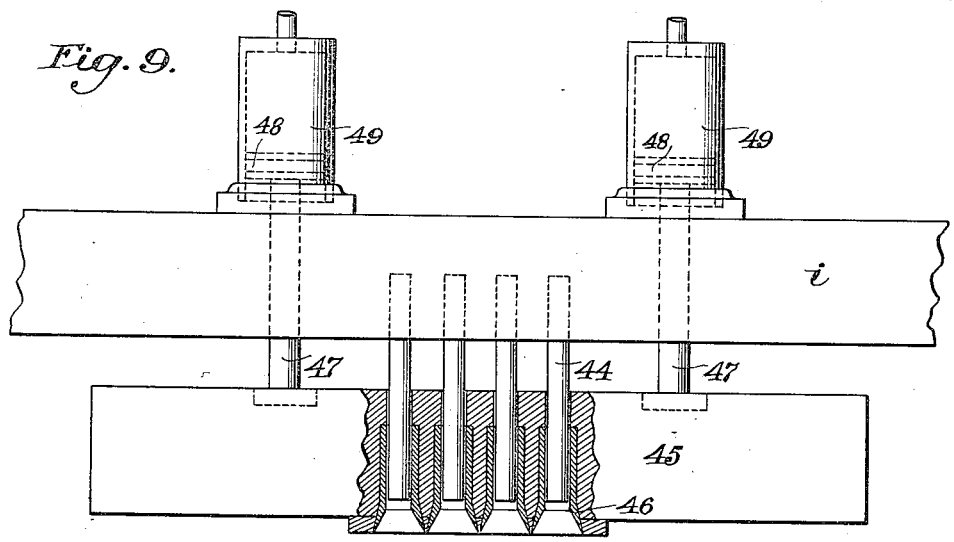
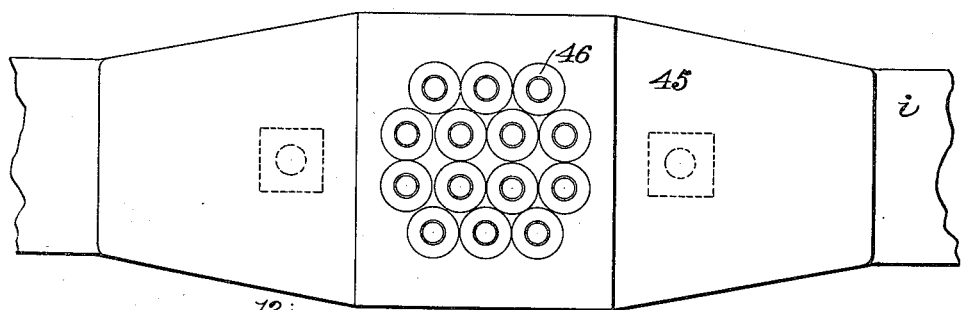
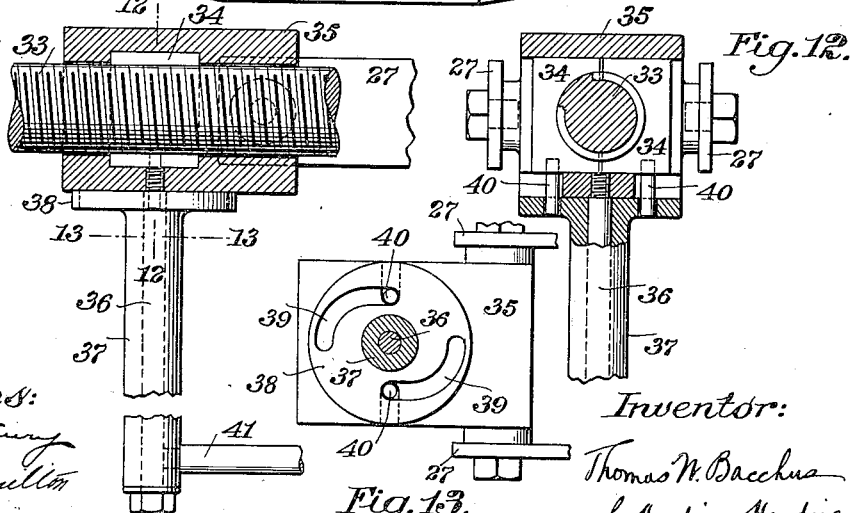
Witnesses:
Inventor:
Thomas W. Bacchus
by Harding & Harding
Attorneys

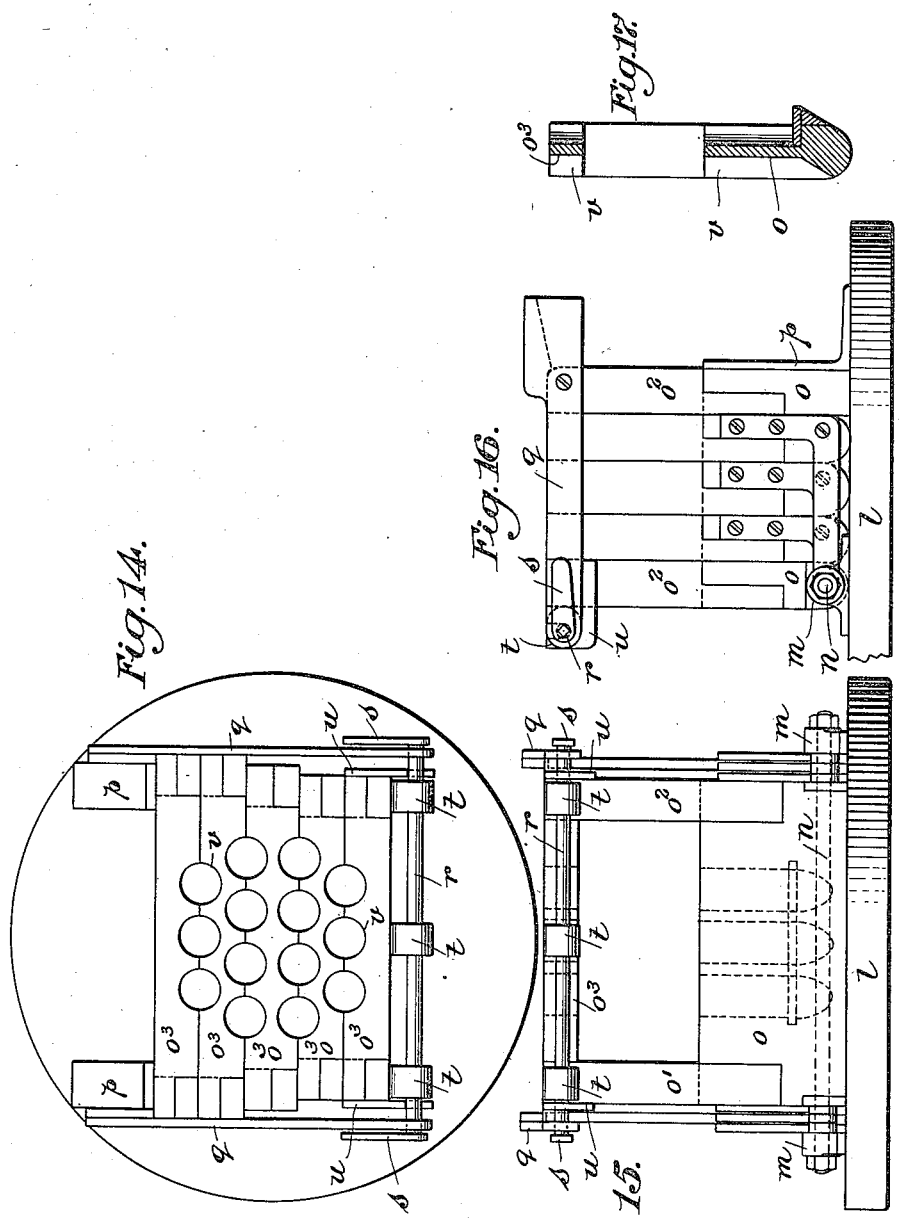

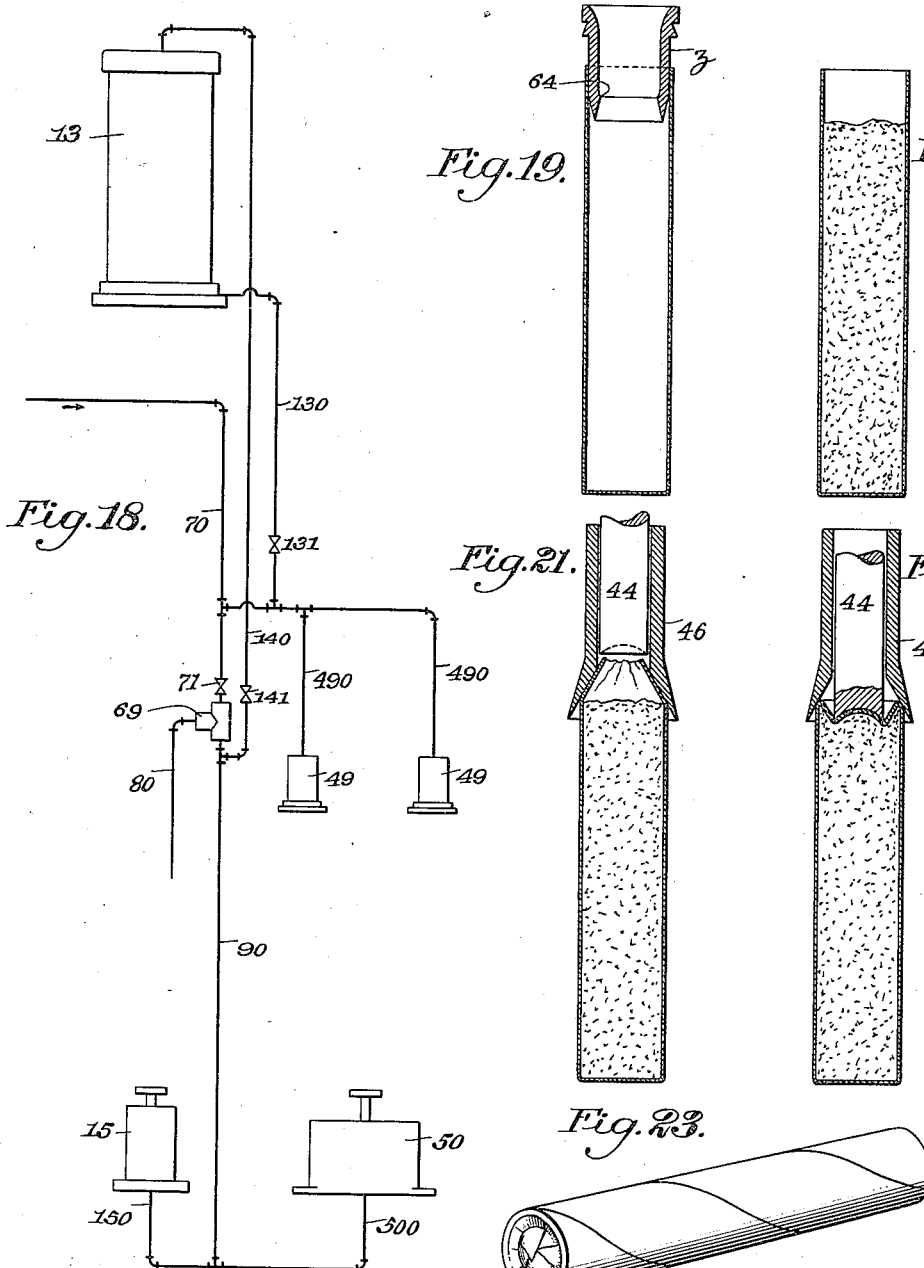

UNITED STATES PATENT OFFICE.

THOMAS W. BACCHUS, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

MACHINE FOR PACKING GELATIN DYNAMITE.

No. 929,815.   Specification of Letters Patent.   Patented Aug. 3, 1909.

Application filed October 2, 1906. Serial No. 337,109.

*To all whom it may concern:*

Be it known that I, THOMAS W. BACCHUS, a subject of the King of Great Britain, residing at Woodbury, county of Gloucester, and State of New Jersey, have invented a new and useful Improvement in Machines for Packing Gelatin Dynamite, of which the following is a full, clear, and exact description, reference being had to the accompanying drawings, which form a part of this specification.

My invention is more particularly intended for packing gelatin dynamite. This explosive has considerable consistency and is usually packed by being forced from a hopper into a screw casing from which it is fed out, cut into lengths by hand, and wrapped by hand.

The object of my invention is to automatically pack explosives of this character in shells and fold the shells to form the completed cartridges.

The invention consists in the general and specific arrangement and construction of parts hereinafter described and more particularly pointed out in the claims.

In the drawings: Figure 1 is a front elevation of the machine; Fig. 2 is a side elevation of the machine; Fig. 3 is a sectional plan on the line 3—3 of Fig. 1 with shell carrier removed; Fig. 4 is a sectional plan on the line 4—4 of Fig. 1 with shell carrier removed; Fig. 5 is an enlarged vertical section through the hopper, feed screw and nipple plate; Fig. 6 is a plan view of the nipple plate; Fig. 7 is a plan view of the lock for the turn table; Fig. 8 is a side elevation of the same; Fig. 9 is an enlarged front elevation, partly in section, of the folding mechanism; Fig. 10 is an inverted plan view of Fig. 9; Fig. 11 is a sectional elevation through the threaded shaft and split nut mechanism; Fig. 12 is a vertical section on line 12—12 of Fig. 11; Fig. 13 is an inverted plan view on the line 13—13 of Fig. 11; Fig. 14 is a plan view of one of the shell carriers; Fig. 15 is a front elevation of same; Fig. 16 is a side elevation of same; Fig. 17 is a vertical sectional view of one of the leaves of the shell carriers; Fig. 18 is a diagrammatic view of pipe connections; Figs. 19—22 are vertical sectional views showing the packing and folding operations; Fig. 23 is a perspective view of the completed cartridge.

The main frame of the machine comprises the base $a$, the uprights $b$, $c$, $d$, $j$ and the cross-pieces $e, f, g, h, i$. On the upright $b$ is a turn table $k$ $k'$ consisting of four radiating arms, each of which carries a shell carrier or shuttle. One of these shell carriers is shown in detail in Figs. 14, 15, 16 and 17. $l$ is the base of the shell carrier, and secured to lugs $m$ thereon is a shaft $n$. Each leaf of the shell carrier consists of a bottom cross-piece $o$, two end posts $o'$ $o^2$ and a top cross piece $o^3$. Four of the leaves are hinged on the shaft $n$, while the fifth or rear leaf is secured to a bracket $p$ on the base $l$. $q$ $q$ are side bars pivoted to the rear leaf and extending forwardly, when in operative position, beyond the front leaf. $r$ is a shaft turning in bearings in the front ends of the side bars. $s$ is a lever secured to the shaft and $t, t, t$ are cams on the shaft. $u$ $u$ are recessed lugs secured to the side bars. The cross-pieces $o$, $o^3$ of the several leaves are provided with semicircular vertical recesses or grooves $v$, the grooves of one leaf registering with the grooves of the adjacent leaf, thereby forming cylindrical orifices for the reception of the shells.

To fill the shell carrier, the side-bars are swung upwardly, and the leaves are free to swing forwardly permitting the shells to be inserted—one row at a time—into the grooves $v$. After all the leaves are swung back into the position shown in Fig. 16, the side-bars $q$ are swung down into the position shown, the shaft $r$ entering the recesses in the lugs $u$. The lever $s$ is thereupon moved into the position shown, turning the shaft so that the cams $t$ force the leaves into close contact, thereby holding the shells securely in the carrier.

After one of the shell carriers is filled by the operator, the turn-table is swung into position under the packing mechanism, and the shells packed with the explosive. The table is then swung into position under the folding mechanism and the ends of the shells are folded inwardly and closed. The table is then swung away from the folding mechanism and the packed and folded shells removed from the shell carrier, the lever $s$ being first turned to relieve the pressure of cams $t$ upon the leaves, and the bars $q$ and cam shaft $r$ carried thereby swung upwardly to unlock the leaves and permit them to be swung forwardly and downwardly. There are thus four main operations, i. e., inserting the empty shells, packing the shells, folding the shells, and removing the completed cartridges. In the machine herein described, the table, as before stated, consists of four radiating arms, each of which carries a shell carrier, and the four operations stated take place simultaneously; that is, while the shells of one carrier are being filled, another set of shells is being packed, a third set folded and a fourth set removed. The table is then given a quarter turn, and the shell carriers from which the finished cartridges have just been removed are filled with empty shells, the empty shells placed in another carrier in the previous operation are filled, the shells filled in the previous operation are folded, and the shells folded in the previous operation are removed. Thus, while four operations are necessary to make the cartridge, one set of cartridges is completed at each operation.

Having thus described the construction of the shell carriers and the general operation of the machine, the packing operation will now be described.

Referring to the general views, Figs. 1, 2, 3 and 4, and the detail views, Figs. 5, 6, 19 and 20: $w$ is a hopper secured to the cross-piece $h$. The hopper is of cylindrical shape except at its upper end, where it is flared outwardly. The bottom of the hopper consists of the nipple plate $x$, which is secured to the vertical wall of the hopper by being bolted to an annular flange $y$ on the lower end of the vertical wall. The nipple plate is provided with a number of orifices, corresponding in number and arrangement with the receptacles in a shell carrier, and in each orifice is inserted a nipple $z$, which depends downwardly from the nipple plate and whose external diameter corresponds substantially to the internal diameter of one of the shells. Within the hopper is a feed-screw 11 on a vertical shaft 10, which extends up through cross-pieces $g$ and $e$ and is provided at its upper end with a piston 12 within a cylinder 13. The piston and cylinder are for the purpose of raising the feed screw out of the hopper when the machine is not in use or when it is desired to give access to the hopper or make any alteration or repair. In operation, however, the feed screw is not moved vertically, but is rotated by mechanism hereinafter described. It will be understood that, as the feed screw rotates, the gelatin dynamite or other plastic explosive is forced down through the nipples $z$ into the shells.

To bring the shells into position to receive the explosive, the shell carrier that has been filled with empty shells is brought under the nipple-plate by manually rotating the turntable, the latter being stopped in the exact appropriate position by an automatically acting locking device to be hereinafter described. Air is then admitted to the lower end of the cylinder 15, which forces its piston 14 upwardly. The piston 14 engages a rod 16 secured to the base $l$ of the shell carrier, and extending down through the turntable, and thus lifts the shell carrier off the turn-table, causing the several shells to move over the mouths of the corresponding nipples, as best shown in Fig. 19.

It is desirable that the feed screw 11 should rotate just sufficiently to pack the shells, and to then stop the rotation of the feed screw until the set of packed shells are removed and another set of empty shells brought into position. Automatic means for regulating the direction of the rotation are shown and will be hereinafter described, but it is possible for an experienced operator to determine this by observation and to stop the rotation of the feed screw by disrupting the driving connections at the proper time. To drive the feed screw thus intermittently, the following means are provided. 17 is a bevel gear feathered on the shaft 10. 19 is a shaft turning in bearings on the cross-piece $e$. 18 is a bevel gear, on shaft 19, meshing with bevel gear 17. 20 is a friction clutch on shaft 19. 21 is a driving pulley loose on shaft 19. By a slight movement of the clutch in one direction or the other, the driving pulley 21 is clutched or unclutched from the shaft 19 and the feed screw shaft rotated or stopped.

To operate the clutch 20, the following means are provided. 22 is a collar loose on the outer end of shaft 19. This collar has a conical inner end adapted when moved inwardly, to engage the fingers 23, pivoted between their ends to a collar 24 secured to the clutch, and cause said fingers to swing and press the clutch into engagement with the driving pulley. Pivoted to the collar 22 is a lever 26 pivoted on pin 25 between the parallel rods 27, 27, supported as hereinafter described. The lower end of the lever 26 is connected, by a link 28, with a lever 29, pivoted at one end to a bracket 30 on the upright $c$. By a slight movement of the lever 26 on the pin 25 as a pivot, the clutch 21 is engaged or disengaged, and the rotation of the feed screw started or stopped. There is, however, automatic mechanism provided for unclutching the shaft, which will now be described. 31 is a bevel gear feathered on the shaft 10. 33 is a threaded shaft supported at one end in a bearing on the cross-piece $e$ and having a bevel gear 32 meshing with the bevel gear 31. The threaded end of the shaft extends within a sectional nut 34 (see Figs. 11, 12 and 13). To the two sections of the nut are bolted the rods 27, 27, which, as before described, have pivoted to them the lever 26. The nut 34 is contained within the box 35. Secured to and depending from the bottom of the box is a shaft 36. Surrounding the shaft is a sleeve 37 having at its upper end the plate 38 underlying the box. In the plate 38 are formed the cam slots 39, 39 and engaging these slots are pins 40, 40 projecting downward from the two sections of the nut. 41 is a lever secured to the sleeve 37. By turning the lever, the sleeve 37 and plate 38 are turned, causing the two sections of the nut 34 to advance toward, or recede from, each other, thus engaging or disengaging the nut 34 and the threaded shaft 33. 42 is a stop (see Fig. 1) on the threaded shaft. 43 is a bracket (see Figs. 1 and 2) secured to the cross-piece f having an arm extending outwardly toward the upper free end of lever 26.

It will be understood that if the feed screw shaft 10 is rotating, it will rotate the threaded shaft 33, and if the nut 34 is engaged with the threaded shaft, the nut will move along the shaft and operate the lever 26. In practice, the following operation occurs: While the feed screw shaft is inactive, the disengaged nut 34 is moved along the threaded shaft until it abuts against the stop 42. The lever 41 is then operated to engage the nut with the threaded shaft, and the lever 25 is moved on the pin 25 as a pivot to clutch the driving pulley 21 to the shaft 19. The feed screw shaft 10 now rotates, which rotates the threaded shaft 33, moving the nut 34 along the shaft and causing the lever 26 to swing on the collar 22 as a pivot. This movement continues until the upper free end of lever 26 engages the bracket 43, after which the lever 26 is in effect pivoted at its upper end, and the collar 22 is drawn away from the clutch fingers 23, releasing the clutch from the driving pulley and stopping the rotation of the feed screw.

After a set of shells is packed, the shell carrier containing them is lowered by opening the lower end of cylinder 15 to the discharge and the turn-table is given a quarter turn, bringing a new shell carrier under the packing mechanism and the shell carrier containing the packed but unfolded shells in line with the folding mechanism. This mechanism is shown in general in Figs. 2 and 3 and in detail in Figs. 9, 10, 21 and 22.

Secured to the cross-piece i are a series of depending rods 44. Beneath the cross-piece is a plate 45 having a plurality of orifices widened out at their lower ends to receive thimbles 46, the inner walls of which lie flush with the inner walls of the upper ends of the orifices, thus forming orifices of uniform diameter to receive the plunger rods 44. The lower ends of the thimbles are, however, flared outwardly. The number and arrangement of the rods and thimbles correspond with the number and arrangement of the shells in a shell carrier. To the plate 45 are secured rods 47 which extend up through the cross-piece i and enter buffer cylinders 49, piston heads 48 being secured to the upper ends of the rods 47. The cylinders 49 are permanently connected at their upper ends with the air pressure main.

When the packed shells are brought underneath the folding mechanism, air is admitted to the cylinder 50 beneath the piston 51, and the latter, in its upward movement, moves upwardly the rod 16, thereby elevating the shell carrier and moving the shells within the flared lower ends of the thimbles 46, folding the upper end of the shells inwardly, as illustrated in Fig. 21. Further upward movement of the shuttle-box elevates the thimble plate, the folding rods 44 moving downwardly, relatively speaking, and completing the folding operation, as shown in Fig. 22. If the thimble plate were free to move upwardly without restraint there would be danger of imperfect folding, but by reason of the fact that the thimble plate is moved upwardly against the air in the buffer cylinders, the proper folding of the shell preliminarily to the action of the rods 44 is insured. After the folding operation, air is exhausted from the cylinder 50, allowing the shell carrier containing the folded and packed shells to drop. The turn-table is then given another quarter turn, the leaves of the shell carrier unlocked, and the cartridges removed. As hereinbefore stated, locking mechanism is provided whereby the turn-table is stopped automatically at each quarter turn so as to bring the shell carrier precisely under the packing mechanism and folding mechanism respectively. This locking mechanism is shown in Figs. 1, 4, 7 and 8.

Secured to the turn-table, under each shuttle-box, is a lug 52. Secured to the upright c is a frame 53, on the under side of which is a groove within which slides a locking bar 54 having a rod 58 surrounded by a coil-spring 59, the rod and spring entering an orifice 60 in the rear of the groove. The front end of the locking bar is provided with a projection 55 having a cam face, a projection 56 extending out beyond projection 55 and a recess 57 between the projections. As the turn-table is swung around, one of the lugs 52 engages the projection 55, forcing the bar 54 inwardly against the action of the spring 59 until the lug overrides the projection 55, whereupon the spring 59 moves the bar outwardly, the lug 52 snapping into the recess 57. To release the turn-table, the lever 61, pivoted to the upright j and having between its ends a slotted arm 62 engaging a pin 63 on the locking bar, is operated to move the locking bar in against the action of the spring until the projection

56 clears the lug 52. The slot in the arm 62 permits the automatic operation of the locking bar hereinbefore described.

It will be understood that in the packing operation, after the shells are filled and before they are depressed, the explosive completely fills the shells and nipples, and that when the shells are depressed, the explosive material should be ruptured at a point a definite distance below the upper end of the shell, thereby causing the amount of explosive material in all the shells to be uniform and leaving a definite length of shell, above the explosive material, to be folded. This result is attained by providing the nipples z with an annular internal ridge 64 and flaring the internal wall of the nipple somewhat outwardly below this ridge toward its lower end. By means of this construction, the explosive material will break off on the line of the ridge 64 when the carrier containing the packed shells is depressed.

It will be understood that air is admitted to or exhausted from the cylinders 15 and 50 simultaneously, so as to produce a simultaneous action of the packing and folding mechanisms.

In Fig. 18 is shown a diagram of the air connections. 70 is a pipe from the source of supply. This pipe is connected by means of branch pipes 490, 490, with the buffer cylinders 49, 49 and by means of branch pipe 130 with the lower end of cylinder 13. The pipe 70 leads to the three-way valve 69, which is also connected with discharge pipe 80 and pipe 90. The latter is connected by pipes 150 and 500 with the cylinders 15 and 50 respectively. A branch 140 from pipe 90 extends to the upper end of cylinder 13. 71 is a valve on supply pipe 70. This valve is open during any operation of the machine. 141 is a valve on pipe 140. 131 is a valve on pipe 130. To lift the piston 12 and feed-screw shaft 10, the valves 131 and 141 are opened and the three-way valve 69 turned to connect pipe 140 and discharge pipe 80. To lower the feed-screw shaft into operative position, the valves 131 and 141 are opened and the three-way valve turned to connect supply pipe 70 and pipe 140. Both ends of the piston 12 being then open to the supply, the feed-screw shaft drops of its own weight.

During the operation of the machine both valves 131 and 141 are closed. To lift the shell carriers the three-way valve is turned to connect supply pipe 70 and pipe 90. To depress the shell carriers the three-way valve is turned to connect pipe 90 and discharge pipe 80 and the shell carriers drop of their own weight.

Having now fully described my invention, what I claim and desire to protect by Letters Patent is:

1. In a machine for packing explosives in shells, the combination with a shell carrier, of a hopper, a plate having a plurality of orifices therein forming the bottom of the hopper, means by which the shell carrier may be brought into and out of operative relation with the plate, and a feeding screw in the hopper to force the explosive material in the hopper through the plate into the shells carried by the shell carrier.

2. In a machine for packing explosives in shells, the combination with a hopper, a feeding screw therein, a plate having a plurality of orifices forming the bottom of the hopper, nipples inserted in the orifices of the plate, a shell carrier having receptacles corresponding in number and position with the nipples, means by which the shell carrier may be brought under the nipple plate, means to elevate the shell carrier, thereby causing the nipples to enter the shells, and a feeding screw to force the explosive material in the hopper, through the nipples into the shells carried by the shell carrier.

3. In a machine for packing explosives in shells, in combination, a table rotatable upon a vertical axis, a shell carrier, adapted to support a plurality of shells, said carrier being mounted upon the table so as to rotate therewith, a hopper, a plate having a plurality of orifices forming the bottom of said hopper, a feeding screw in said hopper, driving means for said feeding screw, and means to bring the shell carrier and orificed hopper plate in operative relation.

4. In a machine for packing explosives in shells, in combination, a table rotatable upon a vertical axis, a shell carrier, adapted to support a plurality of shells, said carrier being mounted upon the table so as to rotate therewith, a hopper, a plate having a plurality of orifices forming the bottom of said hopper, a feeding screw in said hopper, driving means for said feeding screw, means to bring the shell carrier and orificed hopper plate in operative relation, and means operated by the feeding screw to disengage the driving means and feeding screw.

5. In a machine for packing explosives in shells, the combination with a table rotatable upon a vertical axis, of a shell carrier thereon adapted to support a plurality of shells, a hopper, a feed screw therein, a nipple plate having a plurality of orifices forming the bottom of the hopper, means to bring the shell carrier into operative relation with nipple plate, and means to rotate the feed screw.

6. In a machine for packing explosives in shells, the combination with a hopper having a cylindrical body and a flared top, of a feed screw in the cylindrical part of the hopper, a plate having a plurality of orifices forming the bottom of the hopper, nipples inserted in the orifices in said plate, a shell carrier having receptacles for the shells corresponding in number and position with the nipples, means to bring said shell carrier into operative relation with said nipples, driving means for said feed screw, and means operated by the feed screw to disengage the driving means and the feed screw.

7. In a machine for packing explosives in shells, the combination with a hopper, of a feed screw therein, a nipple plate having a plurality of orifices forming the bottom of the hopper, driving means for said feed screw, means operated by the feed screw to disengage the driving means and feed screw, a shell carrier, and means to bring the shell carrier and nipple plate into and out of operative relation while the feed screw is disengaged from the driving means.

8. In a machine for packing explosives in shells, the combination with a hopper, of a feed screw therein, a shaft carrying the feed screw, a nipple plate having a plurality of orifices, forming the bottom of the hopper, a shell carrier having shell receptacles corresponding in number and position with the nipples, means to bring the shell carrier and nipple plate into operative relation, a gear feathered on the shaft, means to move the shaft vertically, a second shaft, a gear thereon meshing with the first gear, a clutch on the shaft, a driving pulley loose on the shaft, and means operated by the feed screw to disengage the clutch and the driving pulley.

9. In a machine for packing explosives in shells, the combination with a hopper, of a nipple plate having a plurality of orifices forming the bottom of the hopper, a feed screw shaft, a driving shaft, driving means, gearing between the two shafts, a clutch by which the driving shaft is engaged with and disengaged from the driving means, a driven shaft, gearing between the driven shaft and feed screw shaft, and means operated by the driven shaft whereby the clutch and driving means are disengaged.

10. In a machine for packing explosives in shells, the combination with a hopper, of a nipple plate having a plurality of orifices forming the bottom of the hopper, a feed screw shaft, a driving shaft, driving means, gearing between the two shafts, a clutch by which the driving shaft is engaged with and disengaged from the driving means, a lever whereby the clutch may be manually engaged with the driving means, a driven shaft, gearing between the driven shaft and feed screw shaft, and means operated by the driven shaft to actuate said lever to release said clutch.

11. In a machine for packing explosives in shells, the combination with a hopper, of a feed screw shaft, a clutch, driving connections between the clutch and feed screw shaft, a threaded driven shaft, gearing between the two shafts, a two part nut, means to advance or retract the nut sections thereby engaging or disengaging the nut and threaded shaft, a lever for operating the clutch, and connections between the nut and clutch lever.

12. In a machine for packing explosives in shells, the combination with a hopper, of a feed screw shaft, a clutch, driving connections between the clutch and feed screw shaft, a threaded driven shaft, gearing between the two shafts, a two part nut, means to advance or retract the nut and threaded shaft, a rod connected with the nut, a clutch-operating collar, a lever pivotally connected with said collar and rod, means connected with one end of the lever for operating it manually, and an abutment against which the other end of the lever is operated by the movement of the nut along the threaded shaft.

13. In a machine for packing explosives in shells, the combination with a hopper, of a feed screw, a clutch, driving means, a device movable toward and from the clutch, a second movable device, a clutch lever pivoted between its ends to both movable devices, one end of the clutch lever being manually movable, an abutment in line of movement of the other end of the clutch lever, and means actuated by the feed screw to move the second movable device, thereby causing the clutch lever to be moved to successively engage said abutment and disengage said clutch and driving means.

14. In a machine for packing explosives in shells, the combination with a plate, having a plurality of orifices and nipples in said orifices, of means to force the explosive material through the nipples, the inner wall of each nipple being flared outwardly near its mouth and having an internal annular ridge above its mouth.

15. In a machine for packing explosives in shells, the combination with a plate having an orifice, a nipple in said orifice, the inner wall of said nipple being flared outwardly near its mouth and having an internal annular ridge about its mouth, of means to force the explosive through said nipple.

16. In a machine for packing explosives in shells, the combination with a cross-piece, of folding rods secured thereto and depending therefrom, a fluid pressure cylinder, a piston therein, an orificed plate supported by the piston, thimbles, flared outwardly at their lower ends, inserted in said plate, and into which said rods extend, a shell carrier having receptacles corresponding in number and arrangement with said rods and thimbles, and means to elevate the shell-carrier, thereby causing the shell to enter the flared mouths of the thimbles and be partly folded and raise the thimble plate against the pressure of fluid in the cylinder to bring the shells into contact with the rods to complete the folding.

17. In a machine for packing explosives in shells, the combination with packing mechanism and folding mechanism, of a table, rotatable upon a vertical axis, shell carriers, each adapted to support a plurality of shells, on the turn table arranged at such a distance apart that when said table is turned, two shell-carriers are brought simultaneously in line respectively one with the packing mechanism, and the other with the folding mechanism, and whereby each shell carrier may be brought successively in line with said mechanisms, and means to bring each shell carrier into and out of operative relation with the mechanism in line therewith.

18. In a machine for packing explosives in shells, in combination, a shell carrier formed of a plurality of sections, each containing a portion of a plurality of recesses adapted to receive shells, vertical parallel arms, one secured to each section, and horizontal parallel arms, one secured to each section, said sections being hinged at a common point whereby the horizontal and vertical alinement of said sections are maintained and the position of the orifices secured.

19. In a machine for packing explosives in shells, the combination with a turn table, of a shell carrier thereon, a rod secured to the shell carrier and extending through and beneath the turn table, folding mechanism, a fluid pressure cylinder beneath the turn table, and a piston therein adapted when raised to engage said rod and elevate the shell carrier into operative engagement with the folding mechanism.

In testimony of which invention, I have hereunto set my hand, at Woodbury, N. J., on this 28th day of September, 1906.

THOMAS W. BACCHUS

Witnesses:
ERNEST REDFIELD,
JACOB H. BIBO.